United States Patent
Rohde et al.

(10) Patent No.: US 7,522,623 B2
(45) Date of Patent: Apr. 21, 2009

(54) METHOD AND SYSTEM FOR EFFICIENTLY USING BUFFER SPACE

(75) Inventors: Derek Rohde, Auburn, CA (US); Michael I. Thompson, Colfax, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 672 days.

(21) Appl. No.: 10/931,851

(22) Filed: Sep. 1, 2004

(65) Prior Publication Data

US 2006/0047868 A1 Mar. 2, 2006

(51) Int. Cl.
*H04L 12/56* (2006.01)
(52) U.S. Cl. ........................ 370/413; 370/421
(58) Field of Classification Search ........... 370/412, 370/413, 415, 417, 419, 420, 421
See application file for complete search history.

(56) References Cited

U.S. PATENT DOCUMENTS

| | | | | |
|---|---|---|---|---|
| 5,136,582 A | * | 8/1992 | Firoozmand | 370/400 |
| 5,303,302 A | * | 4/1994 | Burrows | 713/161 |
| 5,659,690 A | * | 8/1997 | Stuber et al. | 710/307 |
| 5,748,806 A | * | 5/1998 | Gates | 710/315 |
| 5,937,169 A | | 8/1999 | Connery et al. | |
| 6,151,321 A | * | 11/2000 | Benson et al. | 370/395.42 |
| 6,246,683 B1 | | 6/2001 | Connery et al. | |
| 6,247,060 B1 | | 6/2001 | Boucher et al. | |
| 6,334,153 B2 | | 12/2001 | Boucher et al. | |
| 6,389,479 B1 | | 5/2002 | Boucher et al. | |
| 6,393,487 B2 | | 5/2002 | Boucher et al. | |
| 6,427,171 B1 | | 7/2002 | Craft et al. | |
| 6,427,173 B1 | | 7/2002 | Boucher et al. | |
| 6,434,620 B1 | * | 8/2002 | Boucher et al. | 709/230 |
| 6,470,173 B1 | | 10/2002 | Okada et al. | |
| 6,470,415 B1 | | 10/2002 | Starr et al. | |
| 6,591,302 B2 | | 7/2003 | Boucher et al. | |
| 2004/0010612 A1 | * | 1/2004 | Pandya | 709/230 |

\* cited by examiner

*Primary Examiner*—Hassan Kizou
*Assistant Examiner*—Bo Hui A Zhu
(74) *Attorney, Agent, or Firm*—Klein, O'Neill & Singh, LLP

(57) ABSTRACT

A method and system for transferring iSCSI protocol data units ("PDUs") to a host system is provided. The HBA includes, a direct memory access engine operationally coupled to a pool of small buffers and a pool of large buffers, wherein an incoming PDU size is compared to the size of a small buffer and if the PDU fits in the small buffer, then the PDU is placed in the small buffer. The incoming PDU size is compared to a large buffer size and if the incoming PDU size is less than the large buffer size then the incoming PDU is placed in the large buffer. If the coming PDU size is greater than a large buffer, then the incoming PDU is placed is more than one large buffer and a pointer to a list of large buffers storing the incoming PDU is placed in a small buffer.

6 Claims, 5 Drawing Sheets

METHOD AND SYSTEM FOR EFFICIENTLY USING BUFFER SPACE

BACKGROUND

1. Field of the Invention

The present invention relates to network systems, and more particularly, to efficiently using buffer space.

2. Background of the Invention

Storage area networks ("SANs") are commonly used where plural memory storage devices are made available to various host computing systems. Data in a SAN is typically moved from plural host systems (that include computer systems, servers etc.) to a storage system through various controllers/adapters.

Host systems often communicate with storage systems via a host bus adapter ("HBA", may also be referred to as a "controller" and/or "adapter") using an interface, for example, the "PCI" bus interface. PCI stands for Peripheral Component Interconnect, a local bus standard that was developed by Intel Corporation®. The PCI standard is incorporated herein by reference in its entirety. Most modern computing systems include a PCI bus in addition to a more general expansion bus (e.g. the ISA bus). PCI is a 64-bit bus and can run at clock speeds of 33 or 66 MHz.

PCI-X is another standard bus that is compatible with existing PCI cards using the PCI bus. PCI-X improves the data transfer rate of PCI from 132 MBps to as much as 1 GBps. The PCI-X standard was developed by IBM®, Hewlett Packard Corporation® and Compaq Corporation® to increase performance of high bandwidth devices, such as Gigabit Ethernet standard and Fibre Channel Standard, and processors that are part of a cluster.

Various other standard interfaces are also used to move data from host systems to storage devices. Internet SCSI (iSCSI) is one such standard as defined by the Internet Engineering Task Force (IETF) maps the standard SCSI protocol on top of the TCP/IP protocol. iSCSI (incorporated herein by reference in its entirety) is based on Small Computer Systems Interface ("SCSI"), which enables host computer systems to perform block data input/output ("I/O") operations with a variety of peripheral devices including disk and tape devices, optical storage devices, as well as printers and scanners.

A traditional SCSI connection between a host system and peripheral device is through parallel cabling and is limited by distance and device support constraints. For storage applications, iSCSI was developed to take advantage of network architectures based on Fibre Channel and Gigabit Ethernet standards. iSCSI leverages the SCSI protocol over established networked infrastructures and defines the means for enabling block storage applications over TCP (Transmission Control Protocol)/IP (Internet Protocol) networks. iSCSI defines mapping of the SCSI protocol with TCP/IP.

Networks are generally defined as having layers of protocol. The iSCSI and TCP/IP protocol suite consist of 4 protocol layers; the application layer (of which iSCSI is one application), the transport layer (TCP), the network layer (IP) and the link layer (i.e. Ethernet). A complete description of the TCP/IP protocol suite is provided in "TCP/IP" Illustrated, Vol. 1 by W. Richard Stevens and Volume 2 by Gary R. Wright and W. Richard Stevens published by Addison Wesley Professional Computing Series. The following provide a brief overview of TCP, iSCSI and RDMA protocol/standards.

TCP is a network protocol that provides connection-oriented, reliable, byte stream service. This means that two nodes must establish a logical connection before sending data and that TCP maintain state information regarding the data transfer. Reliable means that data is guaranteed to be delivered in the same order that it was sent. A byte stream service means that TCP views data to be sent as a continuous data stream that is sent in any way it sees fit and delivers it to the remote node as a byte stream. There is no concept of a data frame boundary in a TCP data stream.

iSCSI Architecture Overview

The iSCSI architecture is based on a client/server model. Typically, the client is a host system such as a file server that issues a read or write command. The server may be a disk array that responds to the client request.

The following introduces some of the basic terms used in an iSCSI data transfer:

"Exchange"—The operations needed to do a iSCSI data read or write. An exchange consists of three operational phases: command phase, data movement phase and response phase.

"Initiator"—Typically the client is the initiator that initiates a read or write command.

"Target"—Typically a disk array is the target that accepts a read or write command and performs the requested operation.

"Read/Write"—Reads or writes are based on the initiator.

In a typical iSCSI exchange, an initiator sends a "read" or "write" command to a target. For a read operation, the target sends the requested data to the initiator. For a write command, the target sends a "Ready to Transfer Protocol Data Unit ("PDU")" informing the initiator that the target is ready to accept the write data. The initiator then sends the write data to the target. Once the data is transferred, the exchange enters the response phase. The target then sends a response PDU to the initiator with the status of the operation. Once the initiator receives this response, the exchange is complete. The use of TCP guarantees the delivery of the PDUs.

Typically, logical units in the target process commands. Commands are sent by the host system in Command Descriptor Blocks ("CDB"). A CDB is sent to a specific logical unit, for example, the CDB may include a command to read a specific number of data blocks. The target's logical unit transfers the requested data block to the initiator, terminating with a status message indicating completion of the request. iSCSI encapsulates CDB transactions between initiators and targets over TCP/IP networks.

iSCSI PDUs may vary greatly in size, from a few bytes to hundreds of kilobytes. Normally, the size of the data will be known before it is received, and a host computing system can allocate buffers of proper size and assign them to be used when data is received. However, under the iSCSI standard, data may also be transferred along with a command, before a receiving host system can allocate receive buffers.

When this occurs, data may be transferred to unassigned, pre-allocated (small or large) buffers. The choice to use small or large buffers has efficiency tradeoffs, depending on the size of data received. The use of small buffers only is efficient for small PDUs, as there is little unused space in the buffers. However when large amounts of data are transferred to small buffers, the buffers are linked by a scatter/gather list, which requires intense processing.

If only large pre-allocated buffers are used, then the large buffers are under utilized when small PDUs are received. This results in wastage of buffer space.

Therefore, there is a need for a system and method for efficiently using buffer space to handle variable iSCSI PDU sizes.

SUMMARY OF THE INVENTION

In one aspect of the present invention, a method for transferring iSCSI protocol data units ("PDUs") to a host system is provided. The method includes, comparing an incoming PDU size with a size of a small buffer in a small buffer pool; placing the incoming PDU in the small buffer if the PDU fits in the small buffer; determining if the incoming PDU will fit in a large buffer from a large buffer pool; and placing the incoming PDU in the large buffer if the incoming PDU will fit in the large buffer.

The method also includes, placing the incoming PDU in more than one large buffer if the incoming PDU size is greater than a large buffer; and creating a pointer to a list of buffers that are used to store the PDU.

In yet another aspect of the present invention, a host bus adapter with a TCP/IP offload engine for transferring iSCSI protocol data units ("PDU") is provided. The HBA includes, a direct memory access engine operationally coupled to a pool of small buffers and a pool of large buffers, wherein an incoming PDU size is compared to the size of a small buffer and if the PDU fits in the small buffer, then the PDU is placed in the small buffer.

If the incoming PDU size is compared to a large buffer size and if the incoming PDU size is less than the large buffer size then the incoming PDU is placed in the large buffer. If the coming PDU size is greater than a large buffer, then the incoming PDU is placed is more than one large buffer and a pointer to a list of large buffers storing the incoming PDU is placed in a small buffer.

In yet another aspect of the present invention, a TCP/IP offload engine ("TOE") for transferring iSCSI protocol data units ("PDU") is provided. The TOE includes, a pool of small buffers and a pool of large buffers, wherein an incoming PDU size is compared to the size of a small buffer and if the PDU fits in the small buffer, then the PDU is placed in the small buffer.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

To facilitate an understanding of the preferred embodiment, the general architecture and operation of a system using storage devices will be described. The specific architecture and operation of the preferred embodiment will then be described with reference to the general architecture.

Figure 1:
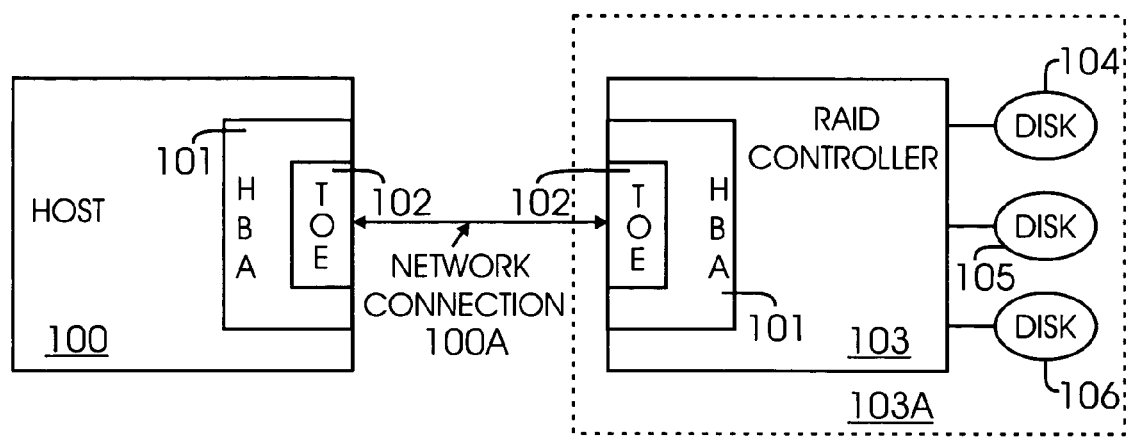
FIG. 1 shows a block diagram of a host system coupled to a storage system using a TOE accelerator, according to one aspect of the present invention.

FIG. 1 shows a block diagram of a host system 100 that is coupled to a storage system 103A via a network connection 100A. Host 100 includes a HBA 101 with a TCP/IP accelerator module (or "chip" or "system") "TOE" 102 that allows connection of SCSI based mass storage devices to a gigabit Ethernet LAN.

System 102 according to the present invention can be used for both initiator and target applications (i.e. can be used on a host bus adapter 101 or with a redundant array of inexpensive disks ("RAID") controller 103. RAID controller 103 is coupled to plural storage devices, for example, 104, 105 and 106.

System 102 provides hardware assistance to improve the speed of iSCSI read and write transactions as well as a full hardware implementation of a TCP/IP protocol stack to assure full gigabit operation. System 102 also includes an embedded gigabit Ethernet MAC, to connect a PCI based host to a LAN (not shown).

The present invention provides a hardware implementation of a full network protocol stack. Application Programming Interfaces (APIs) to this protocol stack are made available to allow host software to take advantage of the hardware acceleration for straight network applications.

The present invention may be used on a PCI development board with a Field Programmable gate Array ("FPGA"). The chip may also be integrated into an Application Specific Integrated Circuit ("ASIC") with an embedded serialize/de-serializer ("SERDES") and internal programmable random access memory ("RAM").

Figure 2:
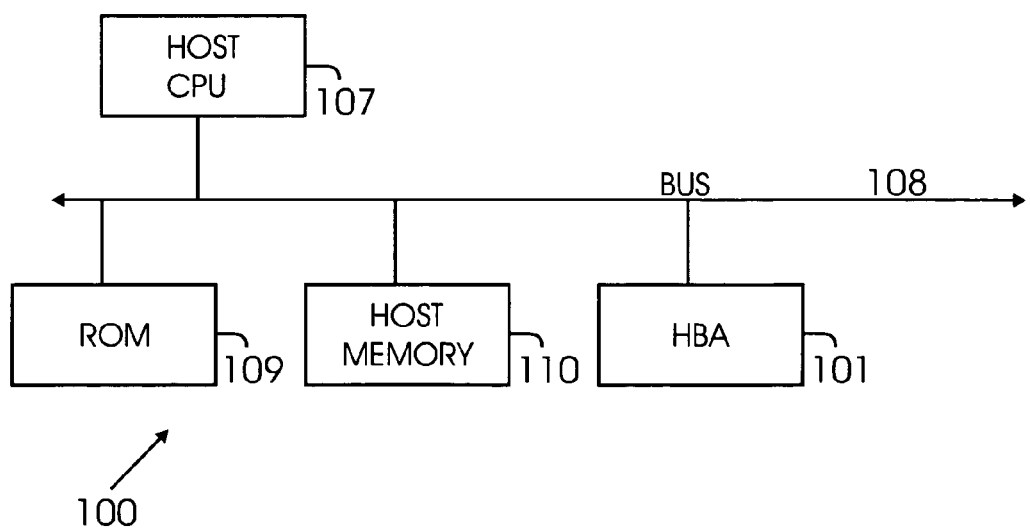
FIG. 2 is a block diagram of a host system.

FIG. 2 shows a block diagram of host system 100. Host system 100 typically includes several functional components. These components may include a central processing unit (CPU) 107, main memory 110, input/output ("I/O") devices (not shown), read only memory 109, and streaming storage devices (for example, tape drives).

In conventional systems, the main memory is coupled to the CPU via a system bus 108 or a local memory bus (not shown). The main memory is used to provide the CPU 107 access to data and/or program information that is stored in main memory at execution time. Typically, the main memory is composed of random access memory (RAM) circuits. A computer system with the CPU and main memory is often referred to as a host system.

Figure 3I:
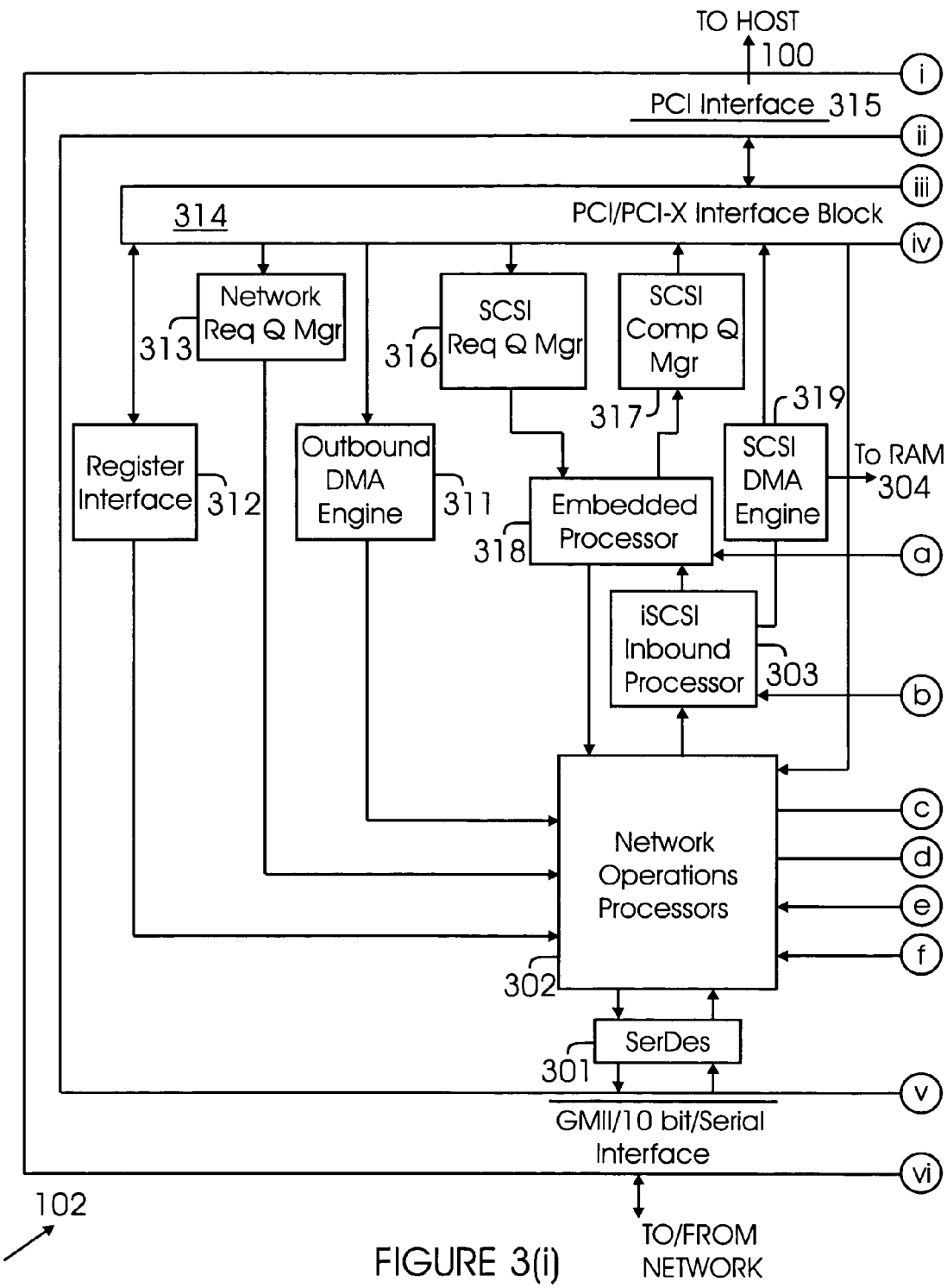
FIG. 3 is a block diagram of a TOE accelerator, according to one aspect of the present invention.
Figure 3:
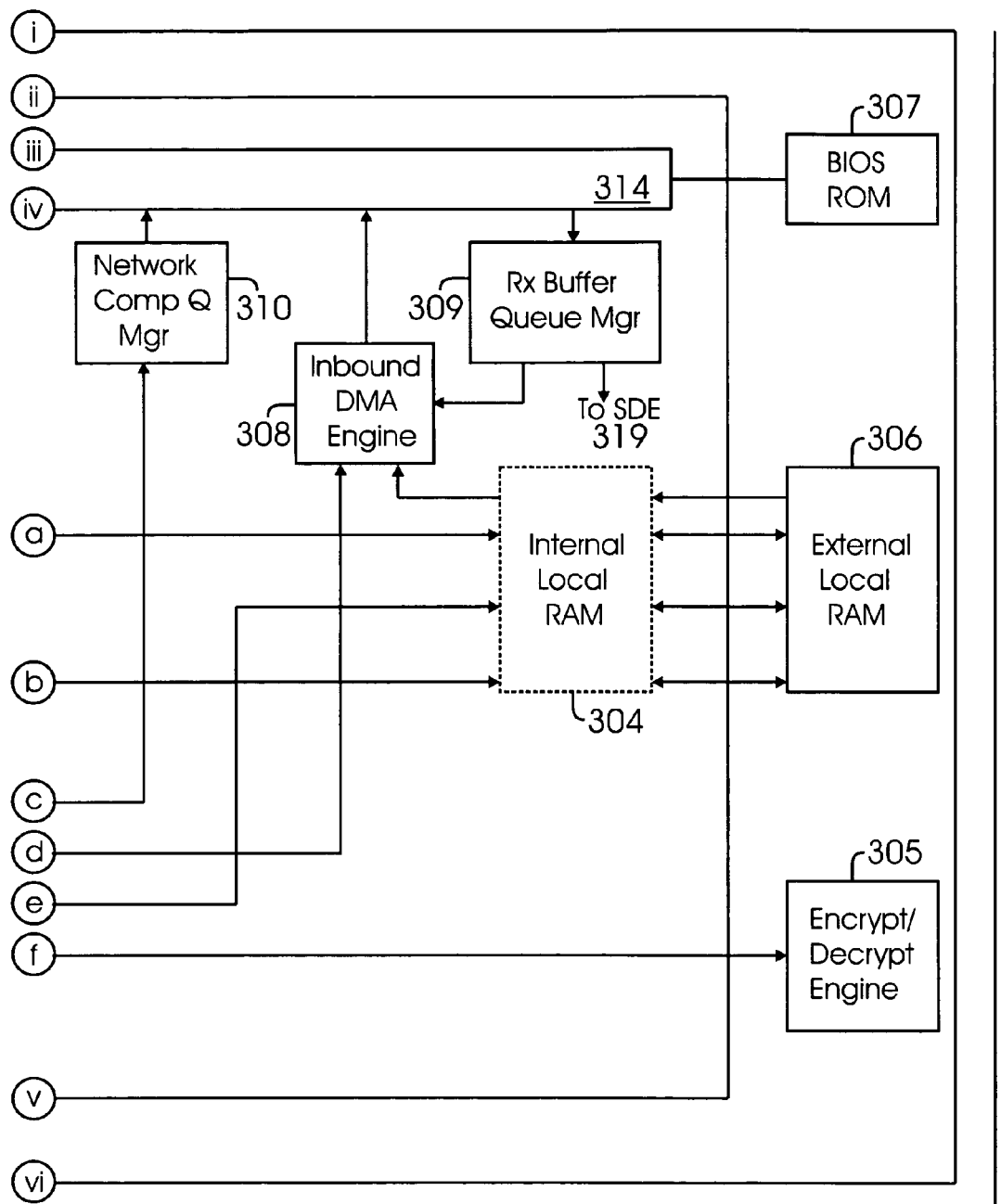

FIG. 3 shows a block diagram of system 102 according to one aspect of the present invention, with various components described below.

System 102 includes an embedded processor 318 that is used to process SCSI requests into iSCSI exchanges to transfer SCSI based data. Processor 318 also generates completion messages for host 100.

iSCSI processor 303 includes hardware state machines/firmware which synchronizes incoming byte streams from TCP, finds iSCSI PDU boundaries, sends data to host 100 via SCSI direct memory access engine/module ("SDE") 319.

System 102 also includes network operation processors 302 that include plural state machines for different network protocols, for example, TCP, IP, and Ethernet for both traffic entering and leaving system 102. The state machines handle most of the data transfer without host CPU 107 involvement.

Local memory interface 304 is used by various system 102 components to access external memory 306 (in this illustration, RAM 306).

Encryption/de-cryption engine 305 is used to encrypt/decrypt data while data is moved in and out of host 100, using system 102. Standard encryption/de-cryption techniques may be used.

Two DMA engines (or modules) are used by NOPs 302 to move data to and from host 100. Inbound DMA module 308 is used to move data from system 102 (i.e. from local memory 306) to host 100 memory. Buffer queue manager 309 maintains small and large buffers that are used by Inbound DMA engine 308. Outbound DMA engine 311 is used to move data from host 100 memory to system 102 for transmission to the network.

SCSI DMA Engine (SDE 319) provides iSCSI processor 303 with a DMA channel from Local RAM 306 to Host 100 memory. SDE 319 includes a byte packer function that takes unaligned or less than 8 byte buffers and packs them into 8 byte words before sending them to Host 104.

System 102 also includes request queue managers (the term manager and module are used interchangeably throughout this specification) (313 and 316) that are used to pass commands to chip 102 to perform a specific operation. SCSI request queue manager 316 is used for initiating SCSI based transfers, while module 313 is used for TCP, IP, Ethernet or any other protocol/standard.

Completion queue managers (310 and 317) are used to send completion messages to host 100. These messages are generated to report status of inbound (i.e. from the network to system 102 and then to host 100) to outbound (i.e. from host 100 to the network via system 102) transfers. SCSI completion manager 317 handles SCSI completion messages, while non-SCSI messages are handled by module 310.

Register interface 312 provides host 100 access to plural system 102 status and control registers, as well as a channel to access local memory 306.

PCI/PCI-X interface block 314 and PCI interface 315 provide a PCI/PCI-X interface between host 100 and system 102. BIOS Read only memory 307 is also provided to store invariant instruction sequences such as start-up instruction sequences or basic input/output operating system (BIOS) sequences instructions.

Data enters/leaves system 102 through a serial/de-serializer ("SERDES") 301 that converts incoming and outgoing data into a serial and non-serial format.

Figure 4:
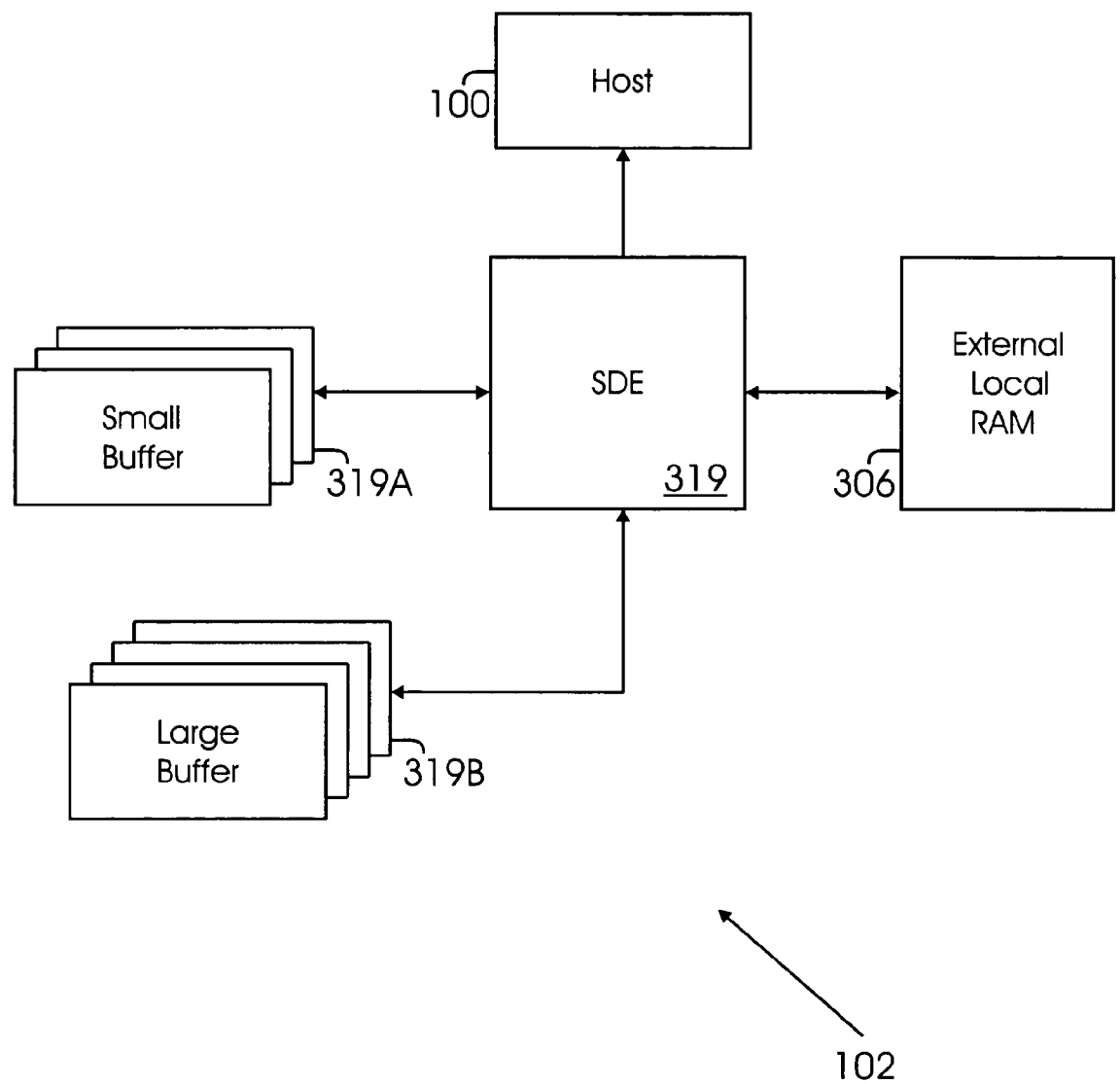
FIG. 4 is a block diagram showing small and large buffers, according to one aspect of the present invention.

FIG. 4 shows another block diagram of system 102 where SDE 319 is operationally coupled to a pool of buffers, namely, small buffer pool 319A and large buffer pool 319B that are used efficiently to store data that is destined for host 100, according to one aspect of the present invention. Data is moved from local RAM 306 to the pre-allocated buffers, as described below.

Small buffer pool 319A includes fixed-size small buffers, while large buffer pool 319B contains fixed-size large buffers. Host 100 or system 102 may define the term "small" and "large".

When a PDU is received from the network to be transferred to host 100, SDE 319 compares the length of the data to the size of a small buffer in pool 319A and a large buffer in pool 319B. If the PDU is small enough to fit completely in a single small buffer, it is transferred to a next small buffer available in pool 319A.

If the PDU is too large to fit in a single small buffer, but small enough to fit in a single large buffer, the PDU is transferred to the next large buffer in pool 319B.

Finally, if the PDU is too large to fit in a single large buffer, it is transferred to plural large buffers, and the addresses of those large buffers are placed in one or more small buffers, which may be linked, creating a scatter gather list. After transfer of the data to host 100, it is notified with a status indicating which transfer method was used (i.e., a small buffer, a large buffer or a group of large buffers with the address in a small buffer).

Figure 5:
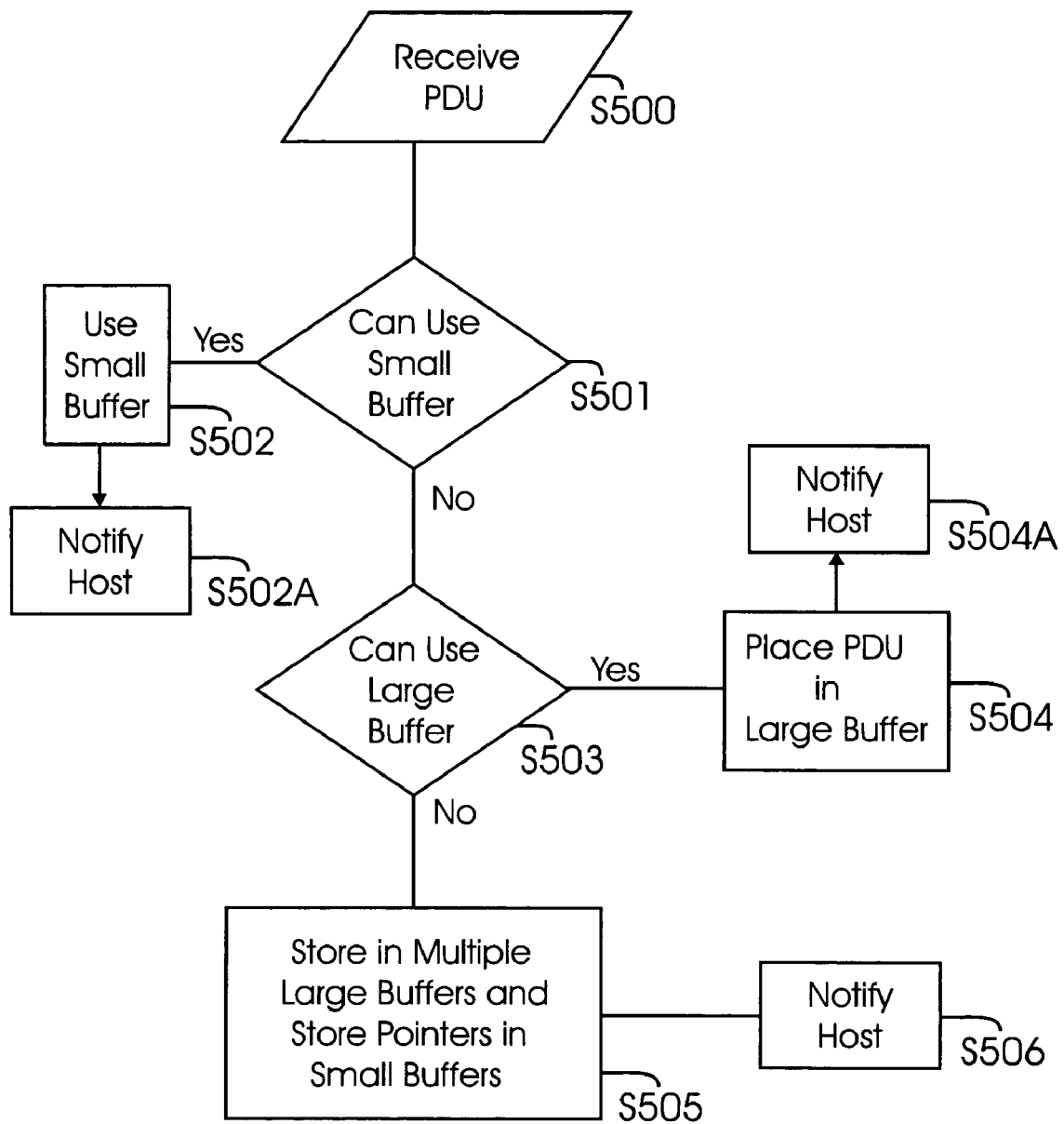
FIG. 5 shows a flow diagram for managing buffer space, according to one aspect of the present invention.

FIG. 5 shows a process flow diagram of using small buffer pool 319A and large buffer pool 319B, according to one aspect of the present invention.

Turning in detail to FIG. 5, in step S500, a PDU is received by system 102. The PDU is received from the network. In step S501, SDE 319 compares the size of the incoming PDU with the size of a small buffer in the small buffer pool 319A. If the PDU can fit in the small buffer, then the PDU is placed in the small buffer in step S502 and data is transferred. Host 100 is notified in step S502A.

If the PDU in step S501 does not fit in the small buffer, then in step S503, SDE 319 determines whether the PDU can be placed in a single large buffer. If it can be placed in a single large buffer, then in step S504, the PDU is placed in a large buffer and host 100 is notified in step S504A.

If the PDU in step S503 cannot fit into a single large buffer, then in step S505, the PDU is placed in more than one large buffer. A scatter-gather list may be created and a pointer (pointing to the list) is placed in a small buffer. In step S506, data is transferred and host 100 is notified of the pointer to the scatter-gather list (not shown).

It is noteworthy that buffer pools 319A and 319B may be of fixed or variable size, and an optimum size may be used to efficiently transfer data.

In one aspect of the present invention, optimal size buffer is used for intermediate storage. Also, using an appropriate size buffer based on PDU size reduces extra processing.

Although the present invention has been described with reference to specific embodiments, these embodiments are illustrative only and not limiting. Many other applications and embodiments of the present invention will be apparent in light of this disclosure and the following claims.

What is claimed is:

1. A method for intermediate storage of incoming iSCSI protocol data units ("PDUs") received by an adapter coupled to a host system with a host system memory and a network system, comprising:

(a) receiving an incoming PDU from the network system, wherein the received PDU includes a command and data, and the received PDU is initially stored in a local memory for the adapter and processed by a processor dedicated for handling the iSCSI PDU;

(b) comparing an incoming PDU size with a size of a small buffer from among a plurality of small buffers of a small buffer pool; wherein the small buffer pool is maintained by a direct memory access (DMA) engine that manages a DMA channel for transferring the PDU to the host system memory and the DMA engine compares the PDU size with the size of the small buffer;

(c) before transferring the PDU to the host system memory, placing the incoming PDU in the small buffer if the PDU fits in the small buffer;

(d) if the PDU does not fit the small buffer in step (b), determining if the incoming PDU will fit in a large buffer from among a plurality of large buffers of a large buffer pool; wherein the large buffer pool is maintained by the DMA engine that determines if the PDU will fit in the large buffer;

(e) before transferring the PDU to the host system memory, placing the incoming PDU in the large buffer if the incoming PDU will fit in the large buffer as determined in step (d);

(f) placing the incoming PDU in more than one large buffer, if the incoming PDU size is greater than a large buffer, as determined in step (d);

(g) creating a pointer to a list of large buffers that are used to store the PDU in step (f); wherein the pointer is stored in the small buffer from the small buffer pool; and notifying the host system whether the small buffer in step (c), the large buffer in step (e), or the more than one large buffer in step (f) is used for intermediate storage.

2. The method of claim 1, wherein the host system is notified of the pointer in step (g) for transferring the PDU to the host system memory.

3. A host bus adapter for transferring iSCSI protocol data units ("PDUs") received from a network system to a host system memory maintained by a host system, comprising:

a local memory that initially stores a PDU after the PDU is received from the network system; and an iSCSI processor that processes the received PDU and sends the PDU to the host system memory via a direct memory access channel (DMA) managed by a DMA engine; wherein the DMA engine maintains a pool of small buffers and a pool of large buffers, for intermediate storage of the PDU before the PDU is transferred to the host system memory, and the DMA engine(a) compares a size of the PDU with the size of a small buffer and if the PDU fits in the small buffer, then the PDU is placed in the small buffer; and (b) if the PDU size is greater than the small buffer size, compares the size of the PDU with a large buffer size and if the PDU size is less than the large buffer size then the PDU is placed in the large buffer; and (c) if the PDU size is greater than a large buffer, then the PDU is placed in more than one large buffer and a pointer to a list of large buffers storing the PDU is placed in the small buffer; wherein the host system is notified whether the small buffer, the large buffer or the more than one large buffer is used for intermediate storage.

4. The host bus adapter of claim 3, wherein to transfer the PDU to the host system memory, the host system is notified of the pointer to the list of large buffers storing the PDU.

5. A system for transferring iSCSI protocol data units ("PDUs"), comprising:

a host system with a host system memory coupled to a network system via a network adapter that receives a PDU from the network system; where the network adapter includes:

a local memory that initially stores the PDU after the PDU is received from the network system; and an iSCSI processor that processes the received PDU and sends the PDU to the host system memory via a direct memory access channel (DMA) managed by a DMA engine; wherein the DMA engine maintains a pool of small buffers and a pool of large buffers for intermediate storage of the PDU before the PDU is transferred to the host system memory, and the DMA engine (a) compares a size of the PDU with the size of a small buffer and if the PDU fits in the small buffer, then the PDU is placed in the small buffer; and (b) if the PDU size is greater than the small buffer size, then compares the size of the PDU with a large buffer size, and if the PDU size is less than the large buffer size then the PDU is placed in the large buffer; and (c) if the PDU size is greater than a large buffer, then the PDU is placed in more than one large buffer and a pointer to a list of the large buffers storing the PDU is placed in the small buffer; wherein the host system is notified whether the small buffer, the large buffer or the more than one large buffer is used for intermediate storage.

6. The system of claim 5, wherein the host system is notified of the pointer to the list of large buffers storing the PDU.

* * * * *